United States Patent [19]
Wasley

[11] Patent Number: 5,791,724
[45] Date of Patent: Aug. 11, 1998

[54] AIR STABILIZER DEVICE FOR BLUFF ROAD VEHICLES

[76] Inventor: Bernard John Wasley, 365 Shenley Lane, Selly Oak, Birmingham, B29 4JJ, England

[21] Appl. No.: 743,030

[22] Filed: Nov. 4, 1996

[51] Int. Cl.$^6$ .................................................. B62D 35/00
[52] U.S. Cl. ........................... 296/180.1; 296/180.2; 296/180.4
[58] Field of Search .................... 296/180.1, 180.2, 296/180.4, 180.5

[56] References Cited

U.S. PATENT DOCUMENTS

| | | | |
|---|---|---|---|
| 3,929,369 | 12/1975 | Blair | 296/91 X |
| 4,437,698 | 3/1984 | Tantalo . | |
| 4,567,734 | 2/1986 | Dankowski | 62/186 |
| 4,693,506 | 9/1987 | Massengill | 296/180.3 |
| 4,957,325 | 9/1990 | Engel | 296/180.2 |
| 5,429,411 | 7/1995 | Spgars | 296/180.1 |

FOREIGN PATENT DOCUMENTS 2275234  8/1994  United Kingdom ................ 296/180.4

*Primary Examiner*—Dennis H. Pedder
*Attorney, Agent, or Firm*—Larson & Taylor

[57] ABSTRACT

A vehicle stabilizer device 4 for a vehicle having a cab 1 and, rearwardly of the cab, a forward facing generally vertically disposed bluff surface 3 extending above the cab 1 on which the device 4 is mounted. The device 4 comprises a row of fins positioned on the bluff front having a plurality of air gaps 7 facing in the direction of forward movement of the vehicle, with each gap 7 opening to a through flow 6 for directing the airflow sideways and downwardly through a gap 5 behind the cab 1.

3 Claims, 3 Drawing Sheets

AIR STABILIZER DEVICE FOR BLUFF ROAD VEHICLES

FIELD OF THE INVENTION

This invention relates to a vehicle stabilizer device for reducing drag on bluff vehicles.

BACKGROUND OF THE INVENTION

The present invention is concerned with the problem of downward, sideways and frontal wind pressure resistance which all types of vehicle/trailer have to overcome.

SUMMARY OF THE INVENTION

This invention consists of a set of fins which are designed to allow the vehicle to remain stable by overcoming wind pressure resistance from all directions. This is done by angling the fins. The top fin cuts into the wind pressure first and this in turn speeds up the flow of air both downwards and sideways to the fins. A variable amount of fins can be used on this air stabilizer. The gaps between the fins are designed to allow a free flow of air from any direction.

BRIEF DESCRIPTION OF THE DRAWINGS

Further details, benefits and advantages of the invention will be understood from the following description of exemplary embodiments with reference to the accompanying drawings wherein.

DETAILED DESCRIPTION OF THE PREFERRED EMBODIMENTS

Figure 2:
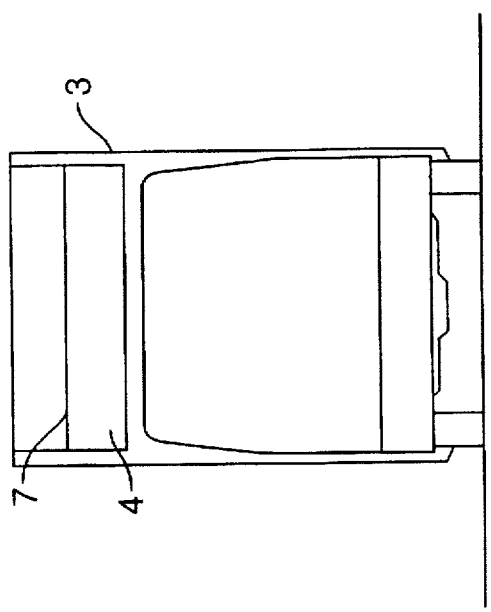
FIG. 2 is a front view of the vehicle shown in FIG. 1.
Figure 1:
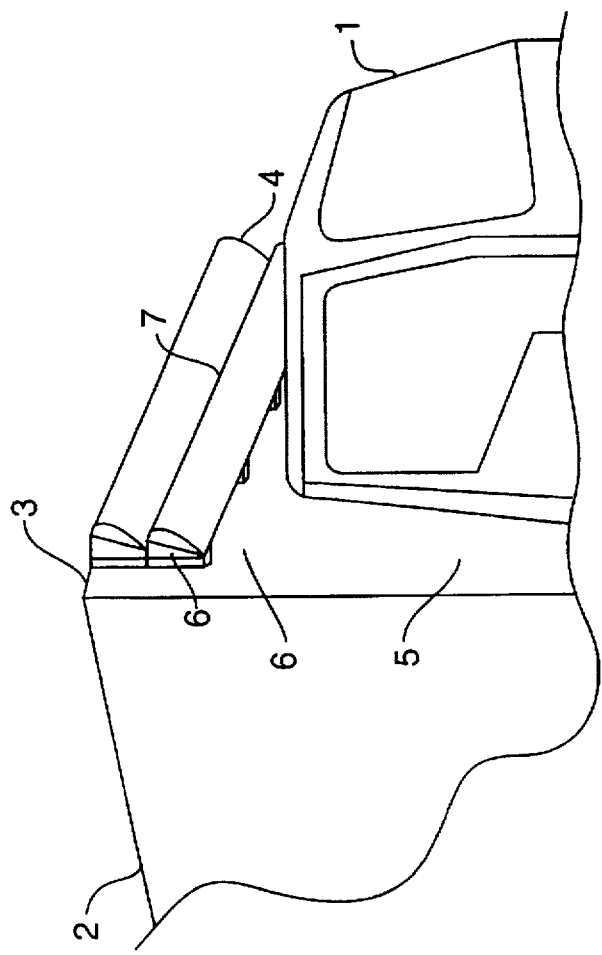
FIG. 1 is a perspective view of a vehicle having a forward facing generally vertically disposed bluff surface provided with a stabilizer device embodying the invention arranged to direct the airflow sideways and downwards.
Figure 3:
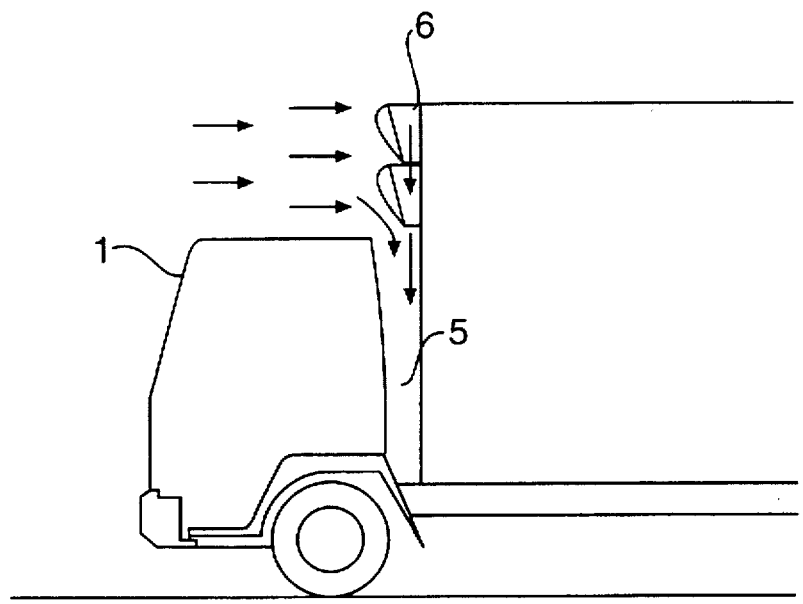
FIG. 3 is a side view of the vehicle shown in FIGS. 1 and 2 indicating the direction of airflow created by the device.

Referring particularly to FIGS. 1 to 3 and 5, a vehicle is shown having a cab 1 and, located rearwardly of cab 1, a forward facing, generally vertically disposed bluff surface 3 extending above cab 1. An air stabilizer device 4, constructed in accordance with the invention, is mounted on bluff surface 3. The device 4 comprises a row of fins which define air gaps 7 therebetween facing in the direction of forward movement of the vehicle. As is perhaps best seen in FIG. 4 which shows three fins, each gap 7 opens to a through flow or flow path 6 which directs the airflow sideways and downwardly through a gap 5 (see FIGS. 1 and 3) behind the cab 1. A shown in FIG. 5, each fin of device 4 is attached to a frame that is angled at the front and each fin of device 4 is attached to a different size frame to form a group or unit, with the largest frame at the top of the unit and the smallest frame at the bottom.

Figure 4:
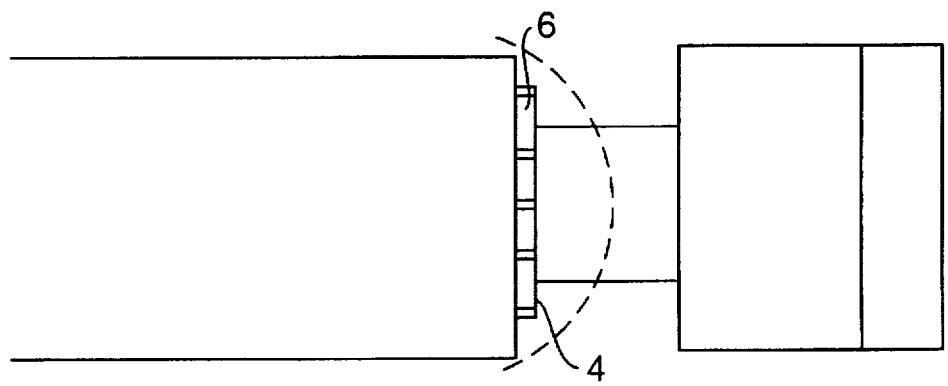
FIG. 4 When fitted to a trailer unit of an articulated vehicle the stabilizer device may be positioned within the turning circle.
Figure 5:
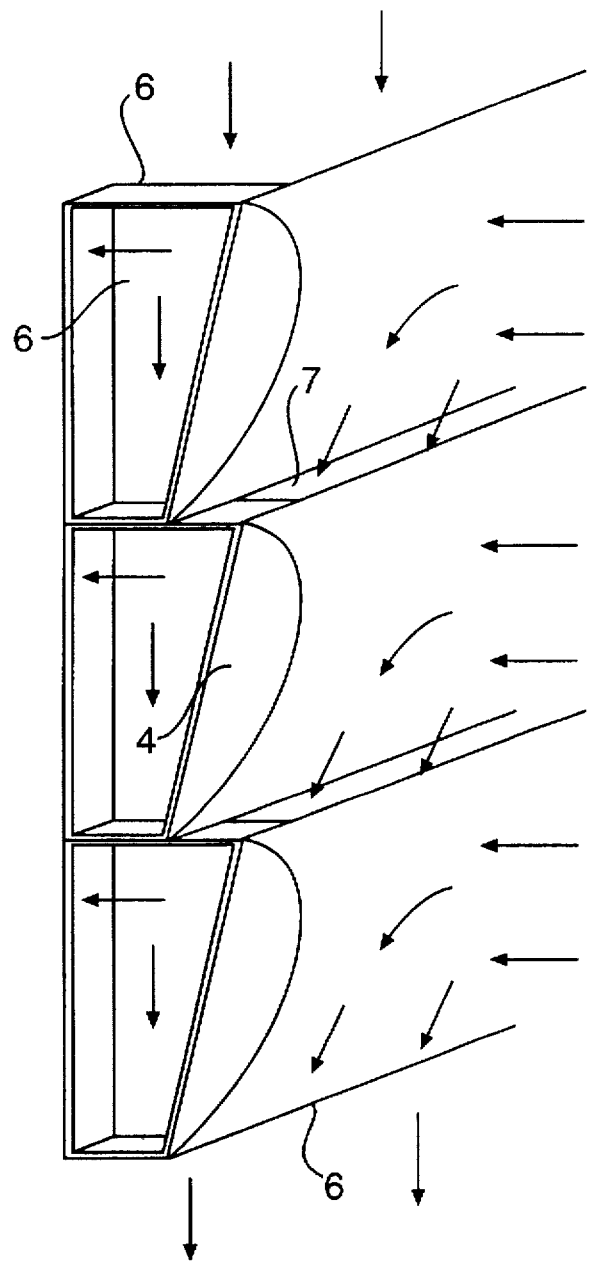
FIG. 5 is a section to an enlarged scale through the stabilizer device shown in FIGS. 1–3.

FIG. 4 shows that when the stabilizer device 4 is fitted to a trailer unit of an articulated vehicle, the device 4 is positioned within the turning circle indicated in dashed lines.

It will be appreciated that with the device 4 pressure is taken off the front 3 thereby stabilizing the vehicle and resulting in lighter steering and reduced tire wear, thus producing a saving in vehicle operating costs.

I claim:

1. A vehicle stabilizer device for a bluff fronted vehicle having a forward facing, generally vertically disposed bluff surface, said device comprising a plurality of fins for mounting in front of the bluff surface in spaced relation to the bluff surface so as to define gaps between said fins and said bluff surface which allow the air to pass through, said fins being mounted in horizontal rows, and at least first and second of said fins being spaced different distances from the bluff surface so as to define a further gap between a lower edge of said first fin and an upper edge of said second fin, each fin being attached to a frame which is angled at the front with respect to the vertical, each said fin being attached to a different size frame to form a unit a first frame being disposed at the top of the unit and defining a first gap, and a second frame being disposed at the bottom of the unit and defining a second gap smaller than said first gap.

2. A device according to claim 1 wherein said fins have convex, forwardly facing front surfaces angled forwardly from the vertical and an uppermost of said fins and said bluff surface define a downwardly tapering substantially wedge-shaped space therebetween.

3. A vehicle stabilizer device for a bluff fronted vehicle having a forward facing generally vertically disposed bluff surface, said device comprising a plurality of fins for mounting in front of the bluff surface in spaced relation to the bluff surface so as to define gaps between said fins and said bluff surface which allow the air to pass through, each said fin being attached to a frame which is angled at the front with respect to the vertical, each said fin being attached to a different size frame to form a unit, a first frame being disposed at the top of the unit and defining a first gap, and a second frame being disposed at the bottom of the unit and defining a second gap smaller than said first gap.

* * * * *